(12) United States Patent
Ota

(10) Patent No.: US 9,646,643 B2
(45) Date of Patent: May 9, 2017

(54) MAGNETIC RECORDING MEDIUM FABRICATION METHOD AND APPARATUS

(71) Applicant: SHOWA DENKO K.K., Tokyo (JP)

(72) Inventor: Ichiro Ota, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 401 days.

(21) Appl. No.: 14/171,937

(22) Filed: Feb. 4, 2014

(65) Prior Publication Data

US 2014/0242268 A1 Aug. 28, 2014

(30) Foreign Application Priority Data

Feb. 25, 2013 (JP) .................................. 2013-034928

(51) Int. Cl.
*G11B 5/84* (2006.01)
*H01F 41/30* (2006.01)

(52) U.S. Cl.
CPC .......... *G11B 5/8408* (2013.01); *H01F 41/308* (2013.01)

(58) Field of Classification Search
None
See application file for complete search history.

(56) References Cited

U.S. PATENT DOCUMENTS

| | | | |
|---|---|---|---|
| 4,671,999 A | 6/1987 | Burguette et al. | |
| 5,409,738 A * | 4/1995 | Matsunuma | B05D 5/08 427/130 |
| 5,846,328 A | 12/1998 | Aruga et al. | |
| 6,001,446 A | 12/1999 | Nakada et al. | |
| 6,335,284 B1 * | 1/2002 | Choi | H01L 21/32136 257/E21.311 |
| 6,627,302 B1 * | 9/2003 | Tang | G11B 5/725 428/212 |
| 6,680,112 B1 * | 1/2004 | Suzuki | G11B 5/8408 427/131 |
| 6,716,303 B1 | 4/2004 | Ni et al. | |
| 6,808,741 B1 * | 10/2004 | McLeod | G11B 5/8408 427/131 |
| 7,155,115 B2 | 12/2006 | Cord | |
| 7,440,233 B2 | 10/2008 | Takahashi | |

(Continued)

FOREIGN PATENT DOCUMENTS

| | | |
|---|---|---|
| JP | H07-211761 | 8/1995 |
| JP | 08-274142 | 10/1996 |
| JP | H10-270527 | 10/1998 |
| JP | 2000-222719 | 8/2000 |
| JP | 2004-002971 | 1/2004 |

(Continued)

OTHER PUBLICATIONS

Office Action mailed on Apr. 26, 2016 issued with respect to the related U.S. Appl. No. 14/017,387.

(Continued)

*Primary Examiner* — Mandy Louie
(74) *Attorney, Agent, or Firm* — Ipusa, PLLC

(57) ABSTRACT

A method of fabricating a magnetic recording medium sequentially forms a magnetic recording layer, a protection layer, and a lubricant layer on a stacked body. The lubricant layer is formed on a surface of the protection layer by vapor-phase lubrication without exposing the stacked body to atmosphere after forming the protection layer on the stacked body. Nitrogen atoms or oxygen atoms are injected onto the surface of the protection layer after forming the protection layer and before forming the lubricant layer.

5 Claims, 4 Drawing Sheets

(56) References Cited

U.S. PATENT DOCUMENTS

| | | | |
|---|---|---|---|
| 8,097,084 B2 | 1/2012 | Geiser et al. | |
| 9,147,422 B2* | 9/2015 | Okabe | G11B 5/85 |
| 9,159,354 B2* | 10/2015 | Okabe | G11B 5/8408 |
| 9,177,587 B2* | 11/2015 | Okabe | G11B 5/8408 |
| 9,196,285 B2* | 11/2015 | Tsutatani | G11B 5/8408 |
| 9,214,178 B2* | 12/2015 | Tsutatani | G11B 5/8408 |
| 2001/0021412 A1* | 9/2001 | Watanabe | C23C 14/352 427/130 |
| 2003/0157374 A1 | 8/2003 | Kato et al. | |
| 2003/0211363 A1* | 11/2003 | Morikawa | G11B 5/72 428/833.4 |
| 2003/0219977 A1 | 11/2003 | Pomarede et al. | |
| 2003/0232220 A1 | 12/2003 | Yatsue | |
| 2004/0185262 A1* | 9/2004 | Shimokawa | B32B 27/28 428/421 |
| 2004/0213951 A1 | 10/2004 | Shimokawa et al. | |
| 2004/0238122 A1 | 12/2004 | Ishizawa et al. | |
| 2005/0044695 A1 | 3/2005 | Fong et al. | |
| 2006/0065194 A1 | 3/2006 | Ham | |
| 2007/0248749 A1 | 10/2007 | Guo et al. | |
| 2008/0001237 A1 | 1/2008 | Chang et al. | |
| 2008/0171435 A1 | 7/2008 | Fujii et al. | |
| 2008/0232948 A1 | 9/2008 | van der Meulen et al. | |
| 2010/0221583 A1 | 9/2010 | Foad et al. | |
| 2010/0232065 A1 | 9/2010 | Suzuki et al. | |
| 2014/0271083 A1 | 9/2014 | Caveney | |

FOREIGN PATENT DOCUMENTS

| | | |
|---|---|---|
| JP | 2006-147012 | 6/2006 |
| JP | 2007-265586 | 10/2007 |
| JP | 2009-211765 | 9/2009 |

OTHER PUBLICATIONS

Office Action mailed on Nov. 6, 2015 issued with respect to the related U.S. Appl. No. 14/017,387.

Restriction/Election Requirement mailed on Sep. 29, 2015 issued with respect to the related U.S. Appl. No. 14/017,387.

Office Action mailed on Sep. 10, 2015 issued with respect to the related U.S. Appl. No. 14/031,184.

Office Action mailed on Mar. 26, 2015 issued with respect to the related U.S. Appl. No. 14/031,184.

Restriction/Election Requirement mailed on Feb. 24, 2015 issued with respect to the related U.S. Appl. No. 14/031,184.

Office Action mailed on May 20, 2015 issued with respect to the related U.S. Appl. No. 14/149,914.

Restriction/Election Requirement mailed on Mar. 24, 2015 issued with respect to the related U.S. Appl. No. 14/149,914.

Advisory Action mailed on Jun. 8, 2015 issued with respect to the related U.S. Appl. No. 14/154,244.

Office Action mailed on Apr. 16, 2015 issued with respect to the related U.S. Appl. No. 14/154,244.

Office Action mailed on Feb. 12, 2015 issued with respect to the related U.S. Appl. No. 14/154,244.

Dupont, Krytox data sheet, downloaded Feb. 6, 2015; evidentiary.

Office Action mailed on Jun. 26, 2015 issued with respect to the related U.S. Appl. No. 14/148,931.

Office Action mailed on Mar. 6, 2015 issued with respect to the related U.S. Appl. No. 14/148,931.

Restriction/Election Requirement mailed on Feb. 6, 2015 issued with respect to the related U.S. Appl. No. 14/148,931.

Office Action mailed on Jun. 8, 2015 issued with respect to the related U.S. Appl. No. 14/217,637.

Office Action mailed on Mar. 18, 2015 issued with respect to the related U.S. Appl. No. 14/217,637.

Kasai Tribology Letters vol. 16 Nos. 1-2 Feb. 2004 p. 29.

Office Action mailed on May 29, 2015 issued with respect to the related U.S. Appl. No. 14/210,956.

Office Action mailed on Mar. 18, 2015 issued with respect to the related U.S. Appl. No. 14/210,956.

\* cited by examiner

MAGNETIC RECORDING MEDIUM FABRICATION METHOD AND APPARATUS

CROSS-REFERENCE TO RELATED APPLICATIONS

This application is based upon and claims the benefit of priority of Japanese Patent Application No. 2013-034928 filed on Feb. 25, 2013, the entire contents of which are incorporated herein by reference.

BACKGROUND OF THE INVENTION

1. Field of the Invention

The present invention relates to a magnetic recording medium fabrication method and a magnetic recording medium fabrication apparatus.

2. Description of the Related Art

Recently, a magnetic storage apparatus may be provided in various products, including a personal computer, a video recorder, a data server, and the like, and the importance of the magnetic storage apparatus is increasing. The magnetic storage apparatus includes a magnetic recording medium that magnetically stores electronic data by magnetic recording. Examples of the magnetic storage apparatus include a magnetic disk drive, a flexible disk drive, a magnetic tape apparatus, and the like. A HDD (Hard Disk Drive) is an example of the magnetic disk drive.

For example, a general magnetic recording medium has a multi-layer stacked structure including an underlayer, an intermediate layer, a magnetic recording layer, and a protection layer that are deposited in this order on a nonmagnetic substrate, and a lubricant layer coated on a surface of the protection layer. In order to prevent mixing of impurities between the layers forming the magnetic recording medium during fabrication of the magnetic recording medium, an in-line vacuum deposition apparatus is used to continuously stack the layers under decompression, as described in Japanese Laid-Open Patent Publication No. 8-274142, for example.

In the in-line vacuum deposition apparatus, a plurality of deposition chambers having a deposition means capable of depositing a layer on the substrate are connected via a gate valve, together with a chamber for carrying out a thermal process and an auxiliary chamber, in order to form a single deposition line. When the substrate is set on a carrier and passed through the deposition line, the layers are successively deposited on the substrate to fabricate the magnetic recording medium having the desired structure.

Generally, the deposition line is arranged in a ring shape, and a substrate loading and unloading chamber is provided in the deposition line in order to load and unload the substrate with respect to the carrier. The carrier which passes through the deposition chambers of the deposition line reaches the substrate loading and unloading chamber where the substrate having the layers deposited thereon is unloaded from the carrier. In addition, after removing the substrate from the carrier, a new substrate to be subjected to the deposition is loaded onto the carrier in the substrate loading and unloading chamber.

In addition, as a method of forming the lubricant layer on the surface of the magnetic recording medium, a vapor-phase lubrication has been proposed in Japanese Laid-Open Patent Publication No. 2004-002971, for example. The vapor-phase lubrication places the magnetic recording medium within a vacuum chamber, and introduces gas lubricant into the vacuum chamber.

Furthermore, forming the protection layer from carbon nitride and forming the lubricant layer from perfluoropolyether that includes a terminal group having an amine structure, in order to increase the bonded ratio between the protection layer and the lubricant layer to 70% or higher, has been proposed in Japanese Laid-Open Patent Publication No. 2000-222719, for example. The bonded ratio is measured by dipping the magnetic recording medium formed with the lubricant layer in a fluorocarbon solvent for five (5) minutes while applying ultrasonic waves, and measuring the absorbance in a vicinity of 1270-$cm^{-1}$ at the same position on the same medium before and after the dipping using ESCA (Electron Spectroscopy for Chemical Analysis). The bonded ratio is defined as a percentage of the ratio of the absorbances before and after the dipping, using a formula [{(Absorbance After Dipping)/(Absorbance Before Dipping)}×100].

However, it is difficult to control the bonded ratio between the protection layer and the lubricant layer in a relatively wide range with a satisfactory reproducibility.

SUMMARY OF THE INVENTION

Embodiments of the present invention may provide magnetic recording medium fabrication method and apparatus that can control the bonded ratio between the protection layer and the lubricant layer in a relatively wide range with a satisfactory reproducibility.

According to one aspect of the present invention, a method of fabricating a magnetic recording medium by sequentially forming a magnetic recording layer, a protection layer, and a lubricant layer on a stacked body, may include forming the lubricant layer on a surface of the protection layer by vapor-phase lubrication without exposing the stacked body to atmosphere after forming the protection layer on the stacked body; and injecting nitrogen atoms or oxygen atoms onto the surface of the protection layer after forming the protection layer and before forming the lubricant layer.

According to another aspect of the present invention, a method of fabricating a magnetic recording medium by sequentially forming a magnetic recording layer, a protection layer, and a lubricant layer on a stacked body, may include forming the lubricant layer on a surface of the protection layer by vapor-phase lubrication without exposing the stacked body to atmosphere after forming the protection layer on the stacked body; and performing nitriding or oxidation of the surface of the protection layer after forming the protection layer and before forming the lubricant layer.

Other objects and further features of the present invention will be apparent from the following detailed description when read in conjunction with the accompanying drawings.

DESCRIPTION OF THE PREFERRED EMBODIMENTS

Figure 1:
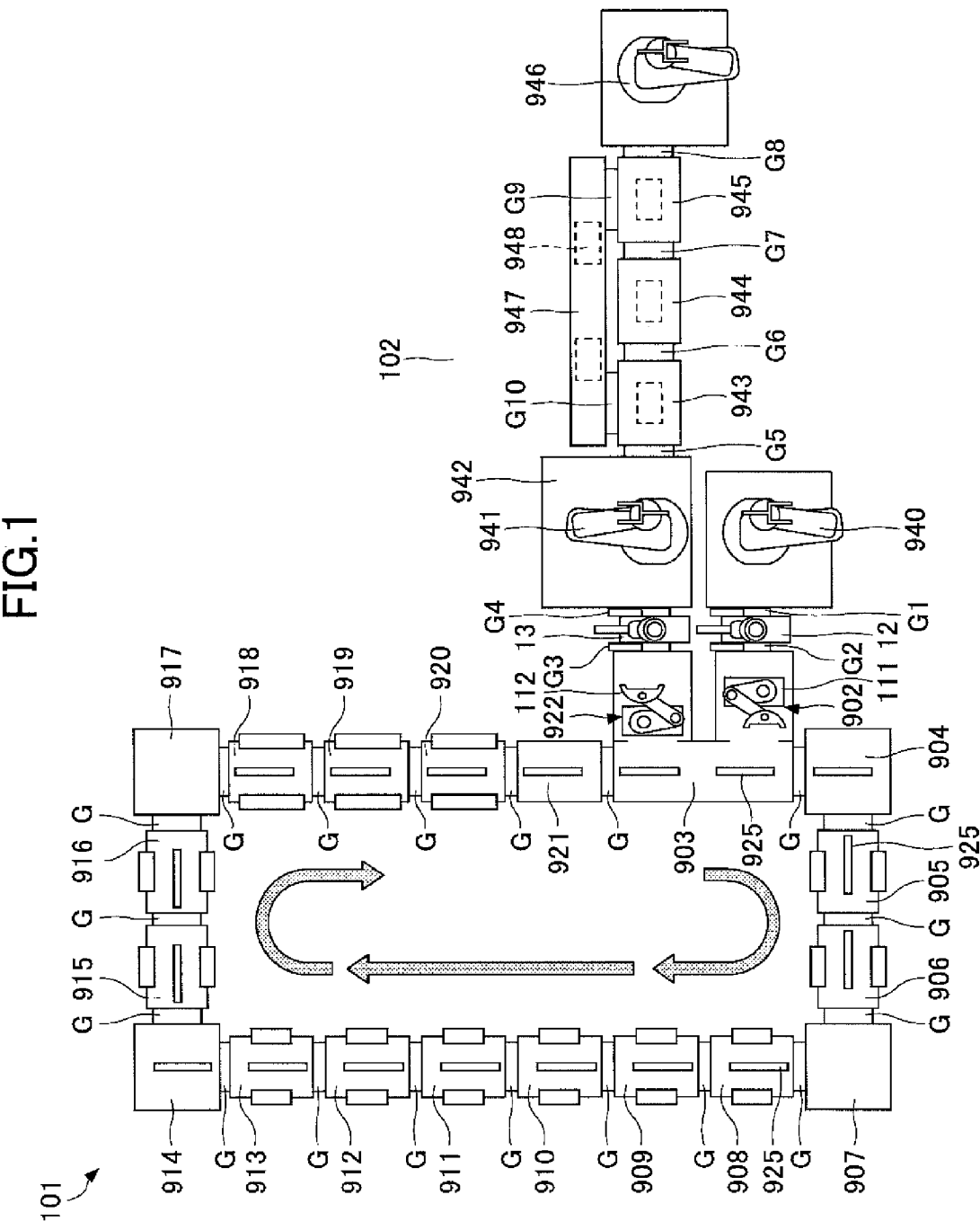
FIG. 1 is a schematic diagram illustrating an example of a magnetic recording medium fabrication apparatus in one embodiment of the present invention.

A description will be given of the magnetic recording medium fabrication method and apparatus in each embodiment of the present invention, by referring to the drawings.

In a case in which the magnetic recording medium having the multi-layer stacked structure described above is fabricated using the in-line vacuum deposition apparatus, the process gas (or sputtering gas) used to form the magnetic recording layer is argon gas, for example, the process gas used to form the protection layer is hydrocarbon gas, hydrogen gas, or argon gas, for example, and the process gas used to form the lubricant layer is high molecular compound, for example. For this reason, between the process to form the magnetic recording layer and the process to form the protection layer, the effects of the process gases mixing between the two adjacent processes may be relatively small. On the other hand, between the process to form the protection layer and the process to form the lubricant layer, the process gases used in the two adjacent processes have considerably different physical properties, and the effects on the layers formed by the two adjacent processes may be large when the process gases mix between the two adjacent processes, to thereby deteriorate the quality of the layers that are formed. In order to prevent the quality of the layers that are formed from deteriorating due to the mixing of the gases between the two adjacent processes, it may be desirable to sufficiently exhaust the residual process gas remaining within the deposition chamber after each layer forming process ends, for example.

In order to prevent the quality of the layers that are formed from deteriorating due to the mixing of the gases between the two adjacent processes, it is conceivable to sufficiently exhaust the residual process gas remaining within the deposition chamber after each layer forming process ends, and to thereafter open a gate valve between the two adjacent deposition chambers to transfer the substrate from one deposition chamber to the other. However, a relatively long exhaust time may be required to sufficiently exhaust the residual process gas within the deposition chamber, and productivity of the in-line vacuum deposition apparatus may deteriorate.

It is also conceivable to provide an auxiliary vacuum chamber between the two adjacent deposition chambers, in order to increase the distance between the two adjacent deposition chambers. However, according to experiments conducted by the present inventor, it was confirmed that slight mixture of the process gases occurs between the two adjacent deposition chambers, even when the distance between the two adjacent deposition chambers is increased. Further, according to experiments conducted by the present inventor, it was confirmed that the process gas adheres onto the carrier that transports the substrate, and the mixture of the process gases occurs via the carrier having the process gas adhered thereon.

Accordingly, in one embodiment of the present invention, in the fabrication method and apparatus that fabricates the magnetic recording medium having the multi-layer stacked body by sequentially forming the magnetic recording layer, the protection layer, and the lubricant layer in this order, the lubricant layer is formed by the vapor-phase lubrication without exposing a stacked body to the atmosphere after forming the protection layer on the stacked body, in order to prevent the impurities from mixing between the protection layer and the lubricant layer.

When a process gas pressure at the time of forming the protection layer is denoted by $P1$, and the process gas pressure at the time of forming the lubricant layer by the vapor-phase lubrication is denoted by $P2$, a region having a gas pressure $P3$ may be provided in a transport path of the stacked body after the formation of the protection layer and before the formation of the lubricant layer, where relationships $P3>P1$ and $P3>P2$ are satisfied. By satisfying these relationships, the process gas for forming the protection layer and the process gas for forming the lubricant layer may be prevented from mixing, in order to prevent the quality of the protection layer and the lubricant layer that are formed from deteriorating due to mixing of the process gases.

Particularly when inert gas is used as the gas forming the gas pressure $P3$, the gas flowing into the chamber in which the protection layer is formed and the chamber in which the lubricant layer is formed becomes the inert gas. Hence, the effects on both the formation of the protection layer and the formation of the lubricant layer may be reduced.

For example, the gas pressure $P1$ is preferably in a range of 1 Pa to 20 Pa, the gas pressure $P2$ is preferably in a range of 1 Pa to 50 Pa, and the gas pressure $P3$ is preferably in a range of 10 Pl to 500 Pa, and the relationships $P3>P1$ and $P3>P2$ are preferably satisfied. In addition, the effect of preventing the mixing of the process gas for forming the protection layer and the process gas for forming the lubricant layer increases as a difference between the gas pressures $P3$ and $P1$ and a difference between the gas pressures $P3$ and $P2$ increase. However, when the difference between the gas pressures $P3$ and $P1$ is too large, the effect of the gas flowing into each process gas increases, and the quality of the protection layer and the lubricant layer may deteriorate. Accordingly, the gas pressure $P3$ is preferably in a range of 10 Pa to 200 Pa, and the difference between the gas pressures $P3$ and $P1$ and the difference between the gas pressures $P3$ and $P2$ are preferably 150 Pa or less. In order to maintain the pressure difference between the gas pressures $P3$ and $P1$ and between the gas pressures $P3$ and $P2$ within a predetermined range, inert gas is preferably supplied to the transport path while increasing the exhaust performance at deposition chambers for the protection layer and the lubricant layer.

According to experiments conducted by the present inventor, when the process of forming the layers of the magnetic recording medium from the magnetic recording layer up to the lubricant layer is performed continuously without exposing the stacked body to the atmosphere, it was confirmed that the bonded ratio between the protection layer and the lubricant layer can be increased up to 100%. However, the 100% bonded ratio between the protection layer and the lubricant layer may not be the optimum condition. In other words, the frictional force as the magnetic head slides on the surface of the magnetic recording medium becomes too large when only the so-called bonded layer, in which the protection layer and the lubricant layer are bonded, exists. Providing the so-called free layer, in which the lubricant layer is not bonded to the protection layer, to a certain extent in addition to the bonded layer, is effective from the standpoint of reducing the frictional force. On the other hand, when the bonded ratio between the protection layer and the lubricant layer is lower than 60%, the lubricant layer may be spinned off by the centrifugal force as the magnetic recording medium rotates at a high speed, and the thickness of the lubricant layer may gradually decrease.

The bonded ratio in this embodiment is measured by dipping the magnetic recording medium formed with the lubricant layer in a fluorocarbon solvent for five (5) minutes, and measuring the absorbance in a vicinity of 1270 cm$^{-1}$ at the same position on the same medium before and after the dipping using ESCA (Electron Spectroscopy for Chemical Analysis). This bonded ratio in this embodiment is defined as a percentage of the ratio of the absorbances before and after the dipping, using a formula [{(Absorbance After Dipping)/(Absorbance Before Dipping)}×100].

From experiments resulting in the bonded ratio of approximately 60% when the lubricant layer is formed after exposing the surface of the magnetic recording layer to the atmosphere, the present inventor experimented on controlling the bonded ratio between the protection layer and the lubricant layer within a range of 60% to 100% by varying the amount of exposure of the surface of the magnetic recording medium to the atmosphere. However, the method of varying the amount of exposure of the surface of the magnetic recording medium to the atmosphere was unable to control the bonded ratio between the protection layer and the lubricant layer within the range of 60% to 100% with a satisfactory reproducibility. According to studies made by the present inventor, it may be regarded that the poor reproducibility is caused by the coverage of the surface of the protection layer by the atmosphere gas that occurs instantaneously, which in turn causes a critical change in the bonded ratio between the protection layer and the lubricant layer from 100% to 60%.

FIG. 1 is a schematic diagram illustrating an example of the magnetic recording medium fabrication apparatus in one embodiment of the present invention. The magnetic recording medium fabrication apparatus illustrated in FIG. 1 may include a deposition apparatus 101 configured to form the layers of the magnetic recording medium up to the protection layer, and a vapor-phase lubrication deposition apparatus 102 configured to form the lubricant layer on the surface of the protection layer.

The deposition apparatus 101 may include a substrate loading and unloading chamber 903, a first corner chamber 904, a first process chamber 905, a second process chamber 906, a second corner chamber 907, a third process chamber 908, a fourth process chamber 909, a fifth process chamber 910, a sixth process chamber 911, a seventh process chamber 912, an eighth process chamber 913, a third corner chamber 914, a ninth process chamber 915, a tenth process chamber 916, a fourth corner chamber 917, an eleventh process chamber 918, a twelfth process chamber 919, a thirteenth process chamber 920 in which nitrogen atoms or oxygen atoms are injected onto a surface of a protection layer as will be described later, and an auxiliary chamber 921 that are connected in a ring shape via inter-chamber gate valves G. Each of the chambers 903 through 921 is surrounded by a plurality of partitioning walls, and includes an internal space that may be put into a decompression state.

The inter-chamber gate valve G, which may freely open and close at a high speed, may be provided between two mutually adjacent chambers (for example, the chambers 905 and 906). All of the gate valves G are opened and closed at the same timing. Hence, each of a plurality of carriers 925 that transport substrates (not illustrated) may move from one to the other of the mutually adjacent chambers with regularity.

Each of the first through thirteenth process chambers 905, 906, 908 through 913, 915, 916, and 918 through 920 may be provided with a substrate heating means (or substrate heater), a deposition means (or deposition part), a process gas supplying means (or process gas (or chlorofluorocarbon gas) supplying part), a process means (or process part), an exhaust means (or exhaust part), and the like. The deposition means may be formed by a sputtering apparatus, an ion beam deposition apparatus, or the like. The process means may inject nitrogen atoms or oxygen atoms onto a process surface to be processed, or perform nitriding or oxidation of the process surface, where the process surface belongs to a stacked body or the like. The gas supplying means and the exhaust means may cause the process gas to flow when necessary. For example, the first process chamber 905 up to the tenth process chamber 916 may be used to form the layers of the magnetic recording medium up to the magnetic recording layer. The eleventh and twelfth process chambers 918 and 919 may be used to form the protection layer, and the process gas pressure may be P1 within the eleventh and twelfth process chambers 918 and 919. In this example, the thirteenth process chamber 920 may be used to inject nitrogen atoms or oxygen atoms onto the surface of the protection layer. More particularly, nitrogen gas or oxygen gas may be ionized by plasma, and the nitrogen atoms (ions) or oxygen atoms (ions) may be accelerated by a high voltage to be injected onto the surface of the protection layer.

In addition, when bonding the protection layer and the lubricant layer by introducing nitrogen gas or oxygen gas into the reaction chamber at a latter stage of the deposition process of the protection layer, the thirteenth process chamber 920 may be used as an auxiliary chamber, and the nitrogen gas or oxygen gas may be introduced as the process gas at a latter stage of the deposition process of the protection layer in the twelfth process chamber 919, in order to perform nitriding or oxidation of the surface of the protection layer.

Figure 2:
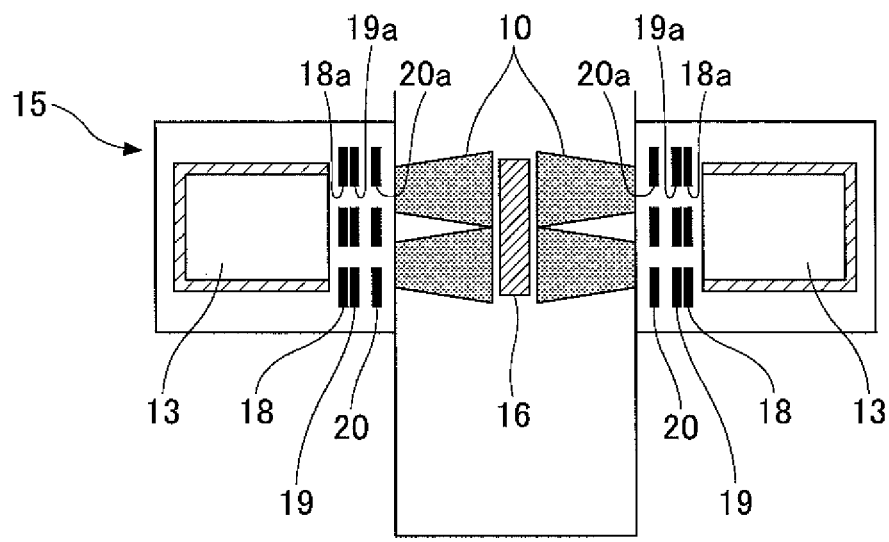
FIG. 2 is a diagram for explaining a nitrogen atom or oxygen atom injecting device.
Figure 3:
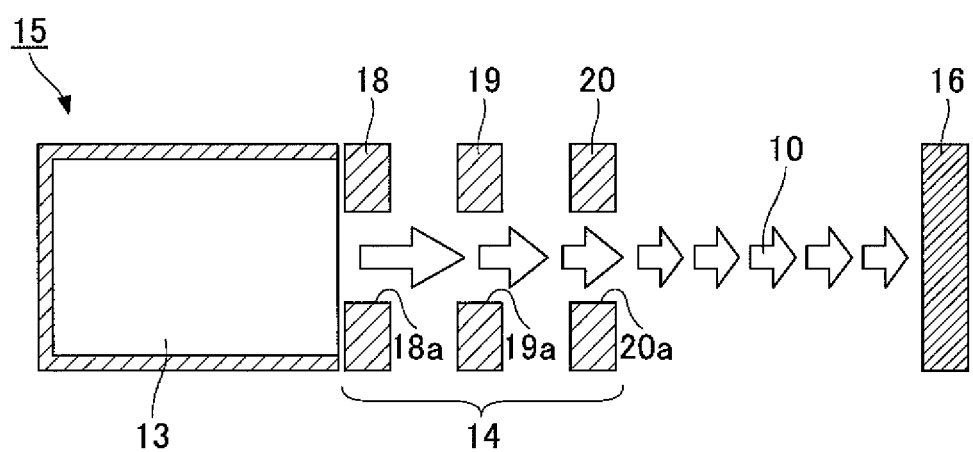
FIG. 3 is a diagram illustrating a part of the injecting device on an enlarged scale.

FIGS. 2 and 3 are diagrams for explaining a nitrogen atom or oxygen atom injecting device. FIG. 2 is a diagram for explaining the nitrogen atom or oxygen atom injecting device, and FIG. 3 is a diagram illustrating a part of the injecting device on an enlarged scale.

In this embodiment, the injection of the nitrogen atoms or oxygen atoms into the protection layer may be realized by ionizing the nitrogen gas or oxygen gas, for example, and injecting the nitrogen atoms (ions) or oxygen atoms (ions) using an ion gun. For example, as illustrated in FIGS. 2 and 3, an ion gun 15 that forms an ion beam 10 may include a plasma generating chamber 13 and electrodes 14 that are connected to a power supply (not illustrated).

The electrodes 14 may include a positive electrode 18, a negative electrode 19, and a ground electrode 20. The positive electrode 18, the negative electrode 19, and the ground electrode 20 are arranged in this order from the plasma generating chamber 13 that forms an ion source towards a stacked body 16 onto which the ion beam 10 lands. The positive electrode 18, the negative electrode 19, and the ground electrode 20 may be formed by mesh-shaped electrodes having mesh-shaped openings 18a, 19a, and 20a, respectively.

The positive electrode 18 has a function to push out the ions generated from the plasma generating chamber 13 towards the stacked body 16, and a voltage applied to the positive electrode 18 is set within a range of +500 V or higher and +1500 V or lower.

In addition, the negative electrode 19 has a function to accelerate the ions pushed out by the positive electrode 18 towards the stacked body 16, and a voltage applied to the negative electrode 19 is set within a range of −2000 V or higher and −1000V or lower.

The ground electrode 20 has a function to stabilize an energy distribution when irradiating the ions pushed out by the positive electrode 18 and accelerated by the negative electrode 19 towards the stacked body 16.

By using the ion gun 15 having the configuration described above, the ion beam 10 is pushed out from the opening 18a of the positive electrode 18, accelerated through the opening 19a of the negative electrode 19, and irradiated onto the stacked body 16 through the opening 20a of the ground electrode 20 that makes the energy distribution uniform.

A base pressure (or reaching pressure) of each of the first through thirteenth process chambers 905, 906, 908 through 913, 915, 916, and 918 through 920 may be set to $1 \times 10^{-5}$ Pa, for example.

The corner chambers 904, 907, 914, and 917 may be arranged at corners of the magnetic recording medium deposition apparatus 101, and change an orientation of the carrier 925 in accordance with a moving direction of the carrier 925. The inside of each of the corner chambers 904, 907, 914, and 917 may be set to vacuum, and each of the corner chambers 904, 907, 914, and 917 may rotate the carrier 925 in a decompression state.

As illustrated in FIG. 1, the substrate loading and unloading chamber 903 is arranged between the first corner chamber 904 and the auxiliary chamber 921. The internal space of the substrate loading and unloading chamber 903 may be larger than that of other chambers. Two carriers 925 may be arranged within the substrate loading and unloading chamber 903, such that the substrate is loaded onto one of the two carriers 925 and the substrate is unloaded from the other of the two carriers 925. Each of the carriers 925 may be transported simultaneously in a direction indicated by arrows in FIG. 1. The substrate loading and unloading chamber 903 may be connected to a substrate input chamber 902 and a substrate output chamber 922.

A vacuum robot 111 may be arranged within the substrate input chamber 902, and another vacuum robot 112 may be arranged within the substrate output chamber 922. The vacuum robots 111 and 112 are examples of a transport apparatus. The substrate input chamber 902 may load the substrate onto the carrier 925 within the substrate loading and unloading chamber 903, using the vacuum robot 111. In addition, The substrate output chamber 922 may unload the substrate from the carrier 925 within the substrate loading and unloading chamber 903, using the vacuum robot 112.

The substrate input chamber 902 may be connected to an airlock chamber 12 via the inter-chamber gate valve G. The substrate output chamber 922 may be connected to an airlock chamber 13 via the inter-chamber gate valve G. Each of the airlock chambers 12 and 13 may store or accommodate therein a plurality of substrates (for example, 50 substrates). Each of the airlock chambers 12 and 13 may include a function to receive the substrate to be stored at one end and to supply the stored substrate at the other end. Each of the airlock chambers 12 and 13 may operate so that the following processes are repeated.

(Input of Substrate to Deposition Apparatus)

The input of the substrate to the deposition apparatus 101 may be carried out by the process including the following steps s1 through s8.

Step s1: Gate values G1 and G2 are closed.

Step s2: The inside of the airlock chamber 12 is set to atmospheric pressure.

Step s3: The gate valve G1 is opened.

Step s4: The plurality of substrates (for example, 50 substrates) are input to the airlock chamber 12 by a substrate input robot 940 which is an example of a transport apparatus.

Step s5: The gate valve G1 is closed.

Step s6: The inside of the airlock chamber 12 is decompressed to vacuum.

Step s7: The gate valve G2 is opened.

Step s8: The substrate within the airlock chamber 12 is loaded onto the carrier 925 within the substrate loading and unloading chamber 903 by the vacuum robot 111.

(Output of Stacked Body from Deposition Apparatus and Input of Stacked Body to Vapor-Phase Lubrication Deposition Apparatus)

The output of the stacked body from the deposition apparatus 101 and the input of the stacked body to the vapor-phase lubrication deposition apparatus 102 may be carried out by the process including the following steps s11 through s18.

Step s11: Gate valves G3 and G4 are closed.

Step s12: The inside of the airlock chamber 13 is decompressed to vacuum.

Step s13: The gate valve G3 is opened.

Step s14: The substrate is removed from the carrier 925 within the substrate loading and unloading chamber 903, and stored within the airlock chamber 12, using the vacuum robot 112.

Step s15: The gate valve G3 is closed until the inside of the airlock chamber 12 becomes full of substrates (for example, 50 substrates are stored).

Step s16: The inside of the airlock chamber 13 is decompressed to vacuum.

Step s17: The gate valve G4 is opened.

Step s18: The substrates (for example, 50 substrates) within the airlock chamber 12 are input to the vapor-phase lubrication deposition apparatus 102 using a vacuum robot 941 provided within a vacuum chamber 942. The vacuum robot 941 is an example of the transport apparatus.

Returning now to the description of FIG. 1, the vapor-phase lubrication deposition apparatus 102 may include an isolation chamber 943 to be filled with inert gas, a vapor-phase lubrication process chamber 944, an airlock chamber 945, and a transport cassette return path chamber 947 that are connected via gate valves G. A substrate output robot 946 for outputting the stacked body formed with the lubricant layer may be provided adjacent to the airlock chamber 945. The substrate output robot 946 is an example of the transport apparatus. A transport cassette 948 configured to transport a plurality of stacked bodies (for example, 50 stacked bodies) may be transported amongst each of the chambers 943 through 945, and 947.

In the magnetic recording medium fabrication apparatus in this embodiment, the process gas pressure within the vapor-phase lubrication process chamber 944 is set to P2, and the process gas pressure within the isolation chamber 943 filled with the inert gas is set to P3.

The stacked bodies (hereinafter also referred to as "substrate") within the vapor-phase lubrication deposition apparatus 102 may move so that the following processes are repeated, and processes including the following steps s21 through s39 may be performed continuously.

Step s21: Gate valves G5 and G6 are closed.

Step s22: The inside of the isolation chamber 943 is decompressed to vacuum.

Step s23: The gate valve G5 is opened.

Step s24: The substrates (for example, 50 substrates) within the airlock chamber 12 are set into the transport cassette 948 within the isolation chamber 943, using the vacuum robot 941.

Step s25: The gate valve is closed.

Step s26: The inert gas is supplied into the isolation chamber 943, to make the gas pressure P3 inside the isolation chamber 943.

Step s27: The gate valve G6 is opened.

Step s28: The transport cassette 948 within the isolation chamber 943 is supplied into the vapor-phase lubrication process chamber 944.

Step s29: The lubricant layer is formed on the stacked bodies within the transport cassette 948 inside the vapor-phase lubrication process chamber 944.

Step s30: A gate valve G7 is opened, and the transport cassette 948 accommodating the stacked bodies formed with the lubricant layer is moved to the airlock chamber 945.

Step s31: The gate valve G7 is closed.

Step s32: The inside of the airlock chamber 945 is set to atmospheric pressure.

Step s33: A gate valve G8 is opened.

Step s34: The processed stacked bodies are extracted by the substrate output robot 946.

Step s35: The gate valve G8 is closed.

Step s36: The inside of the airlock chamber 945 is decompressed to vacuum.

Step s37: A gate valve G9 is opened.

Step s38: The empty transport cassette 948 is moved to the isolation chamber 943 via the return path chamber 947. The inside of the return path chamber 947 is decompressed to vacuum.

Step s39: A gate valve G10 is opened in the decompression state of the isolation chamber 943, and the empty transport cassette 948 is supplied into the isolation chamber 943.

Figure 4:
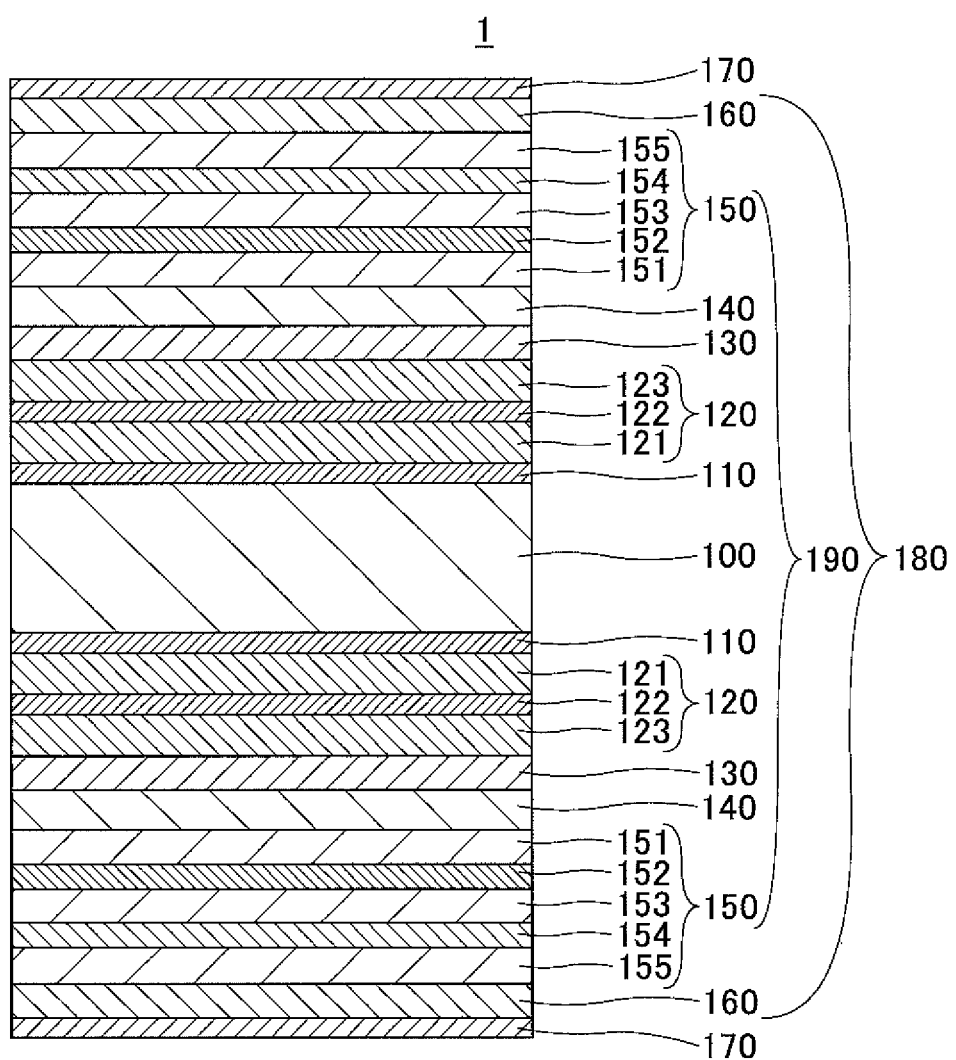
FIG. 4 is a cross sectional view illustrating an example of a magnetic recording medium fabricated by the fabrication apparatus illustrated in FIG. 1.

FIG. 4 is a cross sectional view illustrating an example of a magnetic recording medium 1 fabricated by the fabrication apparatus illustrated in FIG. 1. The data recording system with respect to the magnetic recording medium 1 may be an in-plane (or longitudinal) recording system or a perpendicular recording system, however, it is assumed for the sake of convenience that the magnetic recording medium 1 in this embodiment employs the perpendicular recording system.

The magnetic recording medium 1 may include a substrate 100, a bonding layer 110 formed on the substrate 100, a soft magnetic underlayer 120 formed on the bonding layer 110, an orientation control layer 130 formed on the soft magnetic underlayer 120, a nonmagnetic underlayer 140 formed on the orientation control layer 130, a perpendicular recording layer 150 formed on the nonmagnetic underlayer 140, a protection layer 160 formed on the perpendicular recording layer 150, and a lubricant layer 170 formed on the protection layer 160. The perpendicular recording layer 150 is an example of a magnetic recording layer. In this embodiment, the magnetic recording medium 1 has a configuration in which the bonding layer 110, the soft magnetic underlayer 120, the orientation control layer 130, the nonmagnetic underlayer 140, the perpendicular recording layer 150, the protection layer 160, and the lubricant layer 170 are formed on both sides of the substrate 100. In FIG. 4, a stacked structure in which the bonding layer 110 up to the protection layer 160 are stacked on both sides of the substrate 100, that is, the stacked structure in which all of the layers of the magnetic recording medium 1 except the lubricant layer 170 are formed on both sides of the substrate 100, forms a stacked body 180. Further, in FIG. 4, a stacked structure in which the bonding layer 110 up to the perpendicular recording layer 150 are stacked on both sides of the substrate 100, that is, the stacked structure in which all of the layers of the magnetic recording medium 1 except the protection layer 160 and the lubricant layer 170 are formed on both sides of the substrate 100, forms a stacked body 190.

In this embodiment, the substrate 100 may be made of a nonmagnetic material. For example, the substrate 100 may be formed by a metal substrate made of a metal material such as aluminum, aluminum alloy, and the like. For example, the substrate 100 may be formed by a nonmetallic substrate made of a nonmetallic material such as glass, ceramics, silicon, silicon carbide, carbon, and the like. In addition, the substrate 100 may have a NiP layer or a NiP alloy layer, formed on the surface of the metal substrate or the nonmetallic substrate, by plating, sputtering, or the like.

For example, the glass substrate may also be made of float glass, glass ceramics, and the like. For example, general-purpose soda-lime glass, aluminosilicate glass, and the like may be used for the flat glass. In addition, lithium glass ceramics, and the like, for example, may be used for the glass ceramics. Further, a sintered body having general-purpose aluminum oxide, aluminum nitride, silicon nitride, or the like as its main component, or a fiber reinforced material of such materials, for example, may be used for the ceramic substrate.

Corrosion of the substrate 100 may progress due to the effects of adsorbed gas or moisture on the surface, diffusion of the substrate component, and the like when the substrate 100 makes contact with the soft magnetic underlayer 120 having Co or Fe as its main component as will be described later. For this reason, the bonding layer 110 may preferably be provided between the substrate 100 and the soft magnetic underlayer 120. The material used for the bonding layer 110 may suitably be selected from Cr, Cr alloy, Ti, Ti alloy, and the like, for example. The bonding layer 110 may preferably have a thickness of 2 nm (20 Å) or greater.

The soft magnetic underlayer 120 may be provided to reduce noise at the time of recording and reproduction, in a case in which the perpendicular recording system is employed. In this embodiment, the soft magnetic underlayer 120 may include a first soft magnetic layer 121 formed on the bonding layer 110, a spacer layer 122 formed on the first soft magnetic layer 121, and a second soft magnetic layer 123 formed on the spacer layer 122. In other words, the soft magnetic underlayer 120 may have a structure in which the spacer layer 122 is sandwiched between the first soft magnetic layer 121 and the second soft magnetic layer 123.

The first soft magnetic layer 121 and the second soft magnetic layer 123 may preferably be made of a material including Fe:Co in a range of 40:60 to 70:30 in atomic ratio (at %). In order to improve the permeability and corrosion resistance, the first soft magnetic layer 121 and the second soft magnetic layer 123 may preferably include an element selected from a group consisting of Ta, Nb, Zr, and Cr in a range of 1 at % to 8 at %. In addition, the spacer layer 122 may be made of Ru, Re, Cu, or the like, and may preferably be made of Ru in particular.

The orientation control layer 130 may be provided to improve the recording and reproducing characteristics, by reducing crystal grain sizes of the perpendicular recording layer 150 that is formed via the nonmagnetic underlayer 140. The material used for the orientation control layer 130 is not limited to a particular material, however, a material having a hcp structure, a fcc structure, or an amorphous structure may preferably be used for the orientation control layer 130. The orientation control layer 130 may preferably be made of an Ru alloy, Ni alloy, Co alloy, Pt alloy, or Cu alloy in particular, and the orientation control layer 130 may have a multi-layer structure in which such alloys are stacked. For example, a multi-layer structure formed by Ni alloy and Ru alloy, a multi-layer structure formed by Co alloy and Ru alloy, or a multi-layer structure formed by Pt alloy and Ru alloy, may preferably be formed from the side of the substrate 100.

The nonmagnetic underlayer 140 may be provided to suppress disturbance in crystal growth at an initial stacked part of the perpendicular recording layer 150 that is stacked on the nonmagnetic underlayer 140, and to suppress noise generation at the time of the recording and reproduction. However, the nonmagnetic underlayer 140 may be omitted.

In this embodiment, the nonmagnetic underlayer 140 may preferably be made of a material including a metal having Co as its main component, and additionally including an oxide. A Cr-content of the nonmagnetic underlayer 140 may preferably be in a range of 25 at % to 50 at %. For example, the oxide included in the nonmagnetic underlayer 140 may preferably be an oxide of Cr, Si, Ta, Al, Ti, Mg, Co, or the like. $TiO_2$, $Cr_2O_3$, $SiO_2$, or the like may particularly be preferable for use as the oxide included in the nonmagnetic underlayer 140. The oxide-content of the nonmagnetic underlayer 140 may preferably be in a range of 3 mol % to 18 mol %, with respect to a mol total calculated by regarding an alloy of Co, Cr, Pt, or the like, for example, forming the magnetic grains (or particles), as one compound.

In this embodiment, the perpendicular recording layer 150 may include a first magnetic layer 151 formed on the nonmagnetic underlayer 140, a first nonmagnetic layer 152 formed on the first magnetic layer 151, a second magnetic layer 153 formed on the first nonmagnetic layer 152, a second nonmagnetic layer 154 formed on the second magnetic layer 153, and a third magnetic layer 155 formed on the second nonmagnetic layer 154. In other words, in the perpendicular recording layer 150, the first nonmagnetic layer 152 is sandwiched between the first magnetic layer 151 and the second magnetic layer 153, and the second nonmagnetic layer 154 is sandwiched between the second magnetic layer 153 and the third magnetic layer 155.

The first magnetic layer 151, the second magnetic layer 153, and the third magnetic layer 155 may be provided to store data by inverting the magnetization direction in a direction taken along the thickness of the perpendicular recording layer 150 by the magnetic energy supplied from a magnetic head 3 (illustrated in FIG. 5 which will be described later) and maintaining the state of the magnetization. The first magnetic layer 151, the second magnetic layer 153, and the third magnetic layer 155 may form the magnetic layer of this embodiment.

The first magnetic layer 151, the second magnetic layer 153, and the third magnetic layer 155 may preferably include metal magnetic grains having Co as its main component, and a nonmagnetic oxide, and have a granular structure in which the magnetic grains are surrounded by the oxide.

For example, the oxide included in the first magnetic layer 151, the second magnetic layer 153, and the third magnetic layer 155 may preferably be Cr, Si, Ta, Al, Ti, Mg, Co, or the like. $TiO_2$, $Cr_2O_3$, $SiO_2$, or the like may particularly be preferable for use as the oxide included in the first magnetic layer 151, the second magnetic layer 153, and the third magnetic layer 155. In addition, the lowermost first magnetic layer 151 of the perpendicular recording layer 150 may preferably include a complex (or composite) oxide made up of two or more kinds of oxides. The complex oxide included in the first magnetic layer 151 may preferably be $Cr_2O_3$—$SiO_2$, $Cr_2O_3$—$TiO_2$, $Cr_2O_3$—$SiO_2$—$TiO_2$, or the like.

In addition, the material used for the magnetic grains of the first magnetic layer 151, the second magnetic layer 153, and the third magnetic layer 155 may preferably include compositions such as 90(Co14Cr18Pt)-10($SiO_2$) {mol concentration of 90 mol % calculated using magnetic particles having a Cr-content of 14 at %, a Pt-content of 18 at %, and the remainder Co as one compound, and 10 mol % of an oxide component having $SiO_2$}, 92(Co10Cr16Pt)-8($SiO_2$), 94 (Co8Cr14Pt4Nb)-6($Cr_2O_3$), (CoCrPt)—($Ta_2O_5$), (CoCrPt)—($Cr_2O_3$)—($TiO_2$), (CoCrPt)—($Cr_2O_3$)—($SiO_2$), (CoCrPt)—($Cr_2O_3$)—($SiO_2$)—($TiO_2$), (CoCrPtMo)—(Ti), (CoCrPtW)—($TiO_2$), (CoCrPtB)—($Al_2O_3$), (CoCrPtTaNd)—(MgO), (CoCrPtBCu)—($Y_2O_3$), (CoCrPtRu)—($SiO_2$), and the like.

The first nonmagnetic layer 152 and the second nonmagnetic layer 154 may be provided to facilitate the magnetic inversion in each of the magnetic layers, namely, the first magnetic layer 151, the second magnetic layer 153, and the third magnetic layer 155 forming the perpendicular recording layer 150, and to reduce noise by reducing variance of the magnetic inversions of the magnetic particles as a whole. In this embodiment, the first nonmagnetic layer 152 and the second nonmagnetic layer 154 may preferably include Ru and Co, for example.

In the example illustrated in FIG. 4, the perpendicular recording layer 150 includes magnetic layers (first, second, and third magnetic layers 151, 153, and 155) forming the 3-layer structure, however, the structure of the magnetic layers is not limited to the 3-layer structure, and the magnetic layers may form a multi-layer structure of four (4) or more layers. In addition, although a nonmagnetic layer (a corresponding one of first and second nonmagnetic layers 152 and 154) is interposed between two adjacent magnetic layers (two adjacent ones of first, second, and third magnetic layers 151, 153, and 155) forming the perpendicular recording layer 150, the structure of the magnetic layers forming the perpendicular recording layer 150 is not limited to such a structure. For example, the perpendicular recording layer 150 may have a structure in which two magnetic layers having mutually different compositions are stacked.

The protection layer 160 may be provided to prevent corrosion of the perpendicular recording layer 150, and to prevent damage to the medium surface or the magnetic head 3 itself when the magnetic head 3 and the magnetic recording medium 1 make contact. The protection layer 160 may be provided to also improve the corrosion resistance of the magnetic recording medium 1.

The protection layer 160 may be made of a known material. The protection layer 160 may be made of a material including C, $SiO_2$ or $ZrO_2$, for example. From the standpoint of making the bonded ratio close to 100% between the protection layer 160 and the lubricant layer 170 before the nitrogen atoms or the oxygen atoms are injected onto the surface of the lubricant layer 170 or before nitriding or oxidation of the surface of the lubricant layer 170, the protection layer 160 is preferably made of carbon. From the standpoint of maintaining the hardness of the protection layer 160, making the protection layer 160 relatively thin, and making the bonded ratio close to 100%, the protection layer 160 is preferably be made of amorphous hard carbon or DLC (Diamond Like Carbon). From the standpoint of realizing a high recording density, the protection layer 160 preferably has a thickness of 1 nm to 10 nm, for example, in order to reduce the distance between the magnetic head 3 and the magnetic recording medium 1 in a magnetic storage apparatus which will be described later in conjunction with FIG. 5.

The lubricant layer 170 may be provided to suppress friction between the magnetic head 3 and the surface of the magnetic recording medium 1 when the magnetic head 3 makes contact with the magnetic recording medium 1, and to improve the corrosion resistance of the magnetic recording medium 1. The lubricant layer 170 may be made of a known lubricant material. For example, the lubricant layer 170 may preferably be made of a lubricant such as perfluoropolyether, fluorinated alcohol, fluorinated carboxylic acid, or the like. From the standpoint of realizing a high recording density, the lubricant layer 170 may preferably have a thickness of 1 nm to 2 nm, for example, in order to reduce the distance between the magnetic head 3 and the magnetic recording medium 1 in the magnetic storage apparatus which will be described later in conjunction with FIG. 5.

When forming the lubricant layer 170 by the vapor-phase lubrication, the lubricant is heated to a temperature in a range of 90° C. to 150° C., and vapor of the lubricant is introduced into the reaction chamber. The pressure within the reaction chamber is set to approximately 10 Pa, for example, and an exposure time of the stacked body in the reaction chamber is set to approximately 10 seconds, for example, in order to form the lubricant layer 170 on the surface of the protection layer 160 to a thickness of approximately 1 nm, for example.

Figure 5:
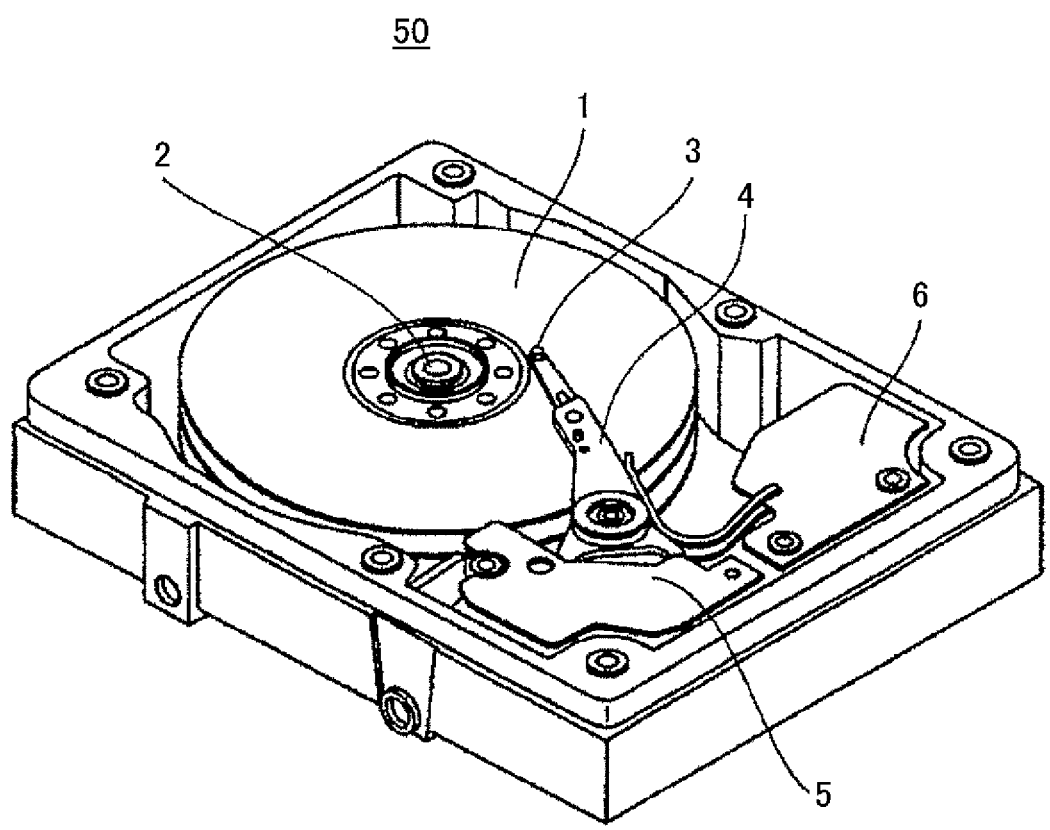
FIG. 5 is a perspective view illustrating an example of a configuration of a magnetic storage apparatus having the magnetic recording medium fabricated in one embodiment of the present invention.

FIG. 5 is a perspective view illustrating an example of a configuration of the magnetic storage apparatus having the magnetic recording medium 1 fabricated in this embodiment of the present invention.

A magnetic storage apparatus 50 illustrated in FIG. 5 may be provided with the magnetic recording medium 1 that magnetically records data, a rotary driving part 2 that rotationally drives the magnetic recording medium 1, the magnetic head 3 that writes (or records) data to and reads (or reproduces) the data from the magnetic recording medium 1, a carriage 4 mounted with the magnetic head 3, a head driving part 5 that moves the magnetic head 3 via the carriage 4 relative to the magnetic recording medium 1, and a signal processor 6. The signal processor 6 may subject data input from an external host unit (not illustrated) or the like to a known signal processing, in order to supply recording signals suited for the recording on the magnetic recording medium 1 to the magnetic head 3. The signal processor 6 may subject the signals read from the magnetic recording medium 1 by the magnetic head 3 to a known signal processing, and output reproduced data to the external host unit or the like.

In the example illustrated in FIG. 5, the magnetic recording medium 1 is a magnetic disk having a disk shape. The magnetic disk includes a magnetic recording layer to record the data, on at least one of the two sides (or surfaces) of the magnetic disk. The magnetic recording layer may be provided on both sides (or both surfaces) of the magnetic disk, as illustrated in FIG. 4. Further, in the example illustrated in FIG. 5, a plurality of magnetic recording media (in this example, three (3) magnetic recording media) are provided in the magnetic storage apparatus 50. However, the number of magnetic recording media 1 provided in the magnetic storage apparatus 50 may be one (1) or greater.

Further, the present invention is not limited to the embodiment, but various variations and modifications may be made without departing from the scope of the present invention.

First Practical Example PE1

Next, a description will be given of a practical example PE1 in which a magnetic recording medium is fabricated by the following fabrication method and evaluated. More particularly, the magnetic recording medium is fabricated using the fabrication apparatus illustrated in FIG. 1. First, a cleaned glass substrate (manufactured by Konica Minolta, Inc. and having an outer diameter of 2.5 inches) is placed within the airlock chamber 12 of the fabrication apparatus illustrated in FIG. 1, and thereafter placed into the carrier 925 using the vacuum robot 111, in order to form stacked layers on the substrate surface. The inside of the deposition chambers are decompressed (or evacuated) to a vacuum (or base pressure) of $1 \times 10^{-5}$ Pa.

Next, a bonding layer having a thickness of 10 nm is deposited on the glass substrate within the process chamber 905 in which the argon gas pressure is 1 Pa, using a 60Cr-50Ti target. In addition, a first soft magnetic layer having a thickness of 34 nm is deposited on the bonding layer within the process chamber 906 in which the argon gas pressure is 1 Pa and the substrate temperature is 100° C. or lower, using a 46Fe-46Co-5Zr-3B {Fe-content of 46 at %, Co-content of 46 at %, Zr-content of 5 at %, and B-content of 3 at %} target. In addition, an Ru layer having a thickness of 0.76 nm is deposited on the first soft magnetic layer within the process chamber 908, using an Ru target. Further, a second soft magnetic layer having a thickness of 34 nm is deposited on the Ru layer within the process chamber 909, using a 46Fe-46Co-5Zr-3B target. The first and second soft magnetic layers sandwiching the Ru layer are formed as the soft magnetic underlayer.

Next, a first underlayer having a thickness of 5 nm is deposited on the soft magnetic underlayer within the process chamber 910 in which the argon gas pressure is 1 Pa, using a Ni-6W {W-content of 6 at %, and the remainder Ni} target. A second underlayer having a thickness of 10 nm is deposited on the first underlayer within the process chamber 911, using an Ru target. A third underlayer having a thickness of 10 nm is deposited within the process chamber 912 in which the argon gas pressure is 1 Pa, using an Ru target. An underlayer having a 3-layer structure is formed by the first, second, and third underlayers.

Next, a magnetic layer having a multi-layer structure is deposited on the underlayer having the S-layer structure. More particularly, a 91(72Co6Cr16Pt6Ru)-4SiO$_2$-3Cr$_2$O$_3$-2TiO$_2$ layer having a thickness of 6 nm is deposited on the third underlayer within the process chamber 913 in which the argon gas pressure is 1 Pa. In addition, a 91 (65Co12Cr13Pt10Ru-4SiO$_2$-3Cr$_2$O$_3$-2TiO$_2$ layer having a thickness of 6 nm is deposited on the 91 (72Co6Cr16Pt6Ru)-4SiO$_2$-3Cr$_2$O$_3$-2TiO$_2$ layer within the process chamber 915 in which the argon gas pressure is 1 Pa. Further, a 63Co15Cr16Pt6B layer having a thickness of 3 nm is deposited on the 91 (65Co12Cr13Pt10Ru-4SiO$_2$-3Cr$_2$O$_3$-2TiO$_2$ layer within the process chamber 916 in which the argon gas pressure is 1 Pa.

Next, a carbon protection layer having a thickness of 2.5 nm is deposited on the magnetic layer within the process chambers 918 and 919, using an ion beam, in order to obtain the stacked body (or magnetic recording medium).

The conditions under which the carbon protection layer is formed using the ion beam may be as follows. That is, toluene gas is used as the source gas, the gas flow rate is set to 2.9 sccm, the reaction pressure is set to 0.3 Pa, the cathode power for thermally exciting and decomposing the source gas is set to 225 W (AC 22.5 V, 10 A), the voltage across a cathode and an anode is set to 75 V, the current is set to 1650 mA, and the acceleration voltage of the ions is set to 200V, 6 mA. Two process chambers are used to deposit the carbon protection layer, and the deposition time in each process chamber is set to 3 seconds.

The base pressure within the process chambers 918 and 919 is $1\times10^{-5}$ Pa, a mixture gas in which 4% methane is mixed to hydrogen gas is used for the process gas, and the gas pressure (P1) is 8 Pa. The chambers 920 and 921 are used as auxiliary chambers, and no process gas is supplied to these auxiliary chambers, and the base pressure within the auxiliary chambers is $1\times10^{-5}$ Pa.

The stacked body that is obtained is removed from the carrier 925 by the vacuum robot 112, and is supplied into the vapor-phase lubrication deposition apparatus 102 by the vacuum robot 941. The base pressure within each of the isolation chamber 943, the vapor-phase lubrication process chamber 944, the airlock chamber 945, and the return path chamber 947 forming the vapor-phase lubrication deposition apparatus 102 is set to $1\times10^{-5}$ Pa. In addition, argon gas is supplied at 50 Pa (gas pressure P3) into the isolation chamber 943, perfluoropolyether gas is supplied at 20 Pa (gas pressure P2) into the vapor-phase lubrication process chamber 944, and no process gas is supplied to the airlock chamber 945 and the return path chamber 947. As a result, a perfluoropolyether lubricant layer having a thickness of 15 Å is formed on the surface of the stacked body by the vapor-phase lubrication deposition apparatus 102.

When the gate valve G6 between the isolation chamber 943 and the vapor-phase lubrication process chamber 944 is opened, the argon gas within the isolation chamber 943 flows into the vapor-phase lubrication process chamber 944, and the pressure difference between the two chambers 943 and 944 decreases. For this reason, while the gate valve G6 is open, the flow rate of the argon gas supplied to the isolation chamber 943 is increased, and the exhaust performance of the vapor-phase lubrication process chamber 944 is increased. In addition, the flow rate and the exhaust performance are similarly increased when opening the gate valve G7 between the vapor-phase lubrication process chamber 944 and the airlock chamber 945.

The stacked body (or magnetic recording medium) formed with the lubricant layer is removed outside the fabrication apparatus, to the atmosphere, using the substrate output robot 946.

In practical examples PE1-1 through PE4-2 and comparison examples CE1 and CE2 described hereinafter, the relationships of the gas pressures P1 through P3 are not the same as those of the practical example PE1, however, the relationships are of course not limited to such.

Practical Example PE1-1

In the practical example PE1-1, the injecting device illustrated in FIG. 2 is used to inject nitrogen atoms onto the protection layer before forming the lubricant layer. The ion beam is generated using a mixture gas in which 40 scum of nitrogen gas and 20 scorn of neon gas are mixed. The amount of ions is $5.5\times10^{15}$ atoms/cm$^2$, the voltage of the positive electrode is +1500 V, the voltage of the negative electrode is −1500 V, the irradiation time of the nitrogen atoms (ions) is 10 seconds (sec.), and the injection depth of the nitrogen atoms (ions) is 1.5 nm.

Practical Example PE1-2

The practical example PE1-2 uses conditions similar to those of the practical example PE1-1, however, the irradiation time of the nitrogen atoms (ions) is 8 seconds.

Practical Example PE1-3

The practical example PE1-3 uses conditions similar to those of the practical example PE1-1, however, the irradiation time of the nitrogen atoms (ions) is 6 seconds.

Practical Example PE1-4

The practical example PE1-4 uses conditions similar to those of the practical example PE1-1, however, the irradiation time of the nitrogen atoms (ions) is 4 seconds.

Practical Example PE2-1

In the practical example PE2-1, the injecting device illustrated in FIG. 2 is used to inject oxygen atoms onto the protection layer before forming the lubricant layer. The ion beam is generated using a mixture gas in which 40 sccm of oxygen gas and 20 scam of neon gas are mixed. The amount of ions is $5.5\times10^{15}$ atoms/cm$^2$, the voltage of the positive electrode is +1500 V, the voltage of the negative electrode is −1500 V, the irradiation time of the oxygen atoms (ions) is 10 seconds (sec.), and the injection depth of the oxygen atoms (ions) is 1.5 nm.

Practical Example PE2-2

The practical example PE2-2 uses conditions similar to those of the practical example PE2-1, however, the irradiation time of the oxygen atoms (ions) is 8 seconds.

Practical Example PE2-3

The practical example PE2-3 uses conditions similar to those of the practical example PE2-1, however, the irradiation time of the oxygen atoms (ions) is 6 seconds.

Practical Example PE2-4

The practical example PE2-4 uses conditions similar to those of the practical example PE2-1, however, the irradiation time of the oxygen atoms (ions) is 4 seconds.

Practical Example PE3-1

In the practical example PE3-1, nitriding of the protection layer is performed at a latter stage of forming the protection layer. More particularly, the ion beam method is used to form the carbon protection layer within the process chambers 918 and 919 to a thickness of 2.5 nm, and nitrogen gas is supplied at a gas flow rate of 2 sccm during the last one (1) second of the 3-second deposition time within the process chamber 919.

Practical Example PE3-2

The practical example PE3-2 uses conditions similar to those of the practical example PE3-1, however, the flow rate of the nitrogen gas is 1 sccm.

Practical Example PE4-1

In the practical example PE4-1, oxidation of the protection layer is performed at a latter stage of forming the protection layer. More particularly, the ion beam method is used to form the carbon protection layer within the process chambers 918 and 919 to a thickness of 2.5 nm, and oxygen gas is supplied at a gas flow rate of 2 sccm during the last one (1) second of the 3-second deposition time within the process chamber 919.

Practical Example PE4-2

The practical example PE4-2 uses conditions similar to those of the practical example PE4-1, however, the flow rate of the oxygen gas is 1 scorn.

Comparison Example CE1

In the comparison example CE1, the lubricant layer is formed without injecting nitrogen as in the case of the practical examples 1-1 through 1-4 or injecting oxygen as in the case of the practical examples 2-1 through 2-4, and without exposing the stacked body after forming the protection layer to the atmosphere.

Comparison Example CE2

In the comparison example CE2, the stacked body after forming the protection layer is exposed to the atmosphere, and the lubricant layer is formed thereafter.

The following Table 1 illustrates results of evaluating the bonded ratios for each of the practical examples PE1-1 through PE4-2 and the comparison examples CE1 and CE2. The bonded ratio is measured using Vertrel XF manufactured by Du Pont-Mitsui Fluorochemicals Co., Ltd. for the fluorocarbon solvent.

TABLE 1

| Example | Processing Method | Bonded Ratio |
| --- | --- | --- |
| PE1-1 | Irradiation Time: 10 sec. | 87% |
| PE1-2 | Irradiation Time: 8 sec. | 88% |
| PE1-3 | Irradiation Time: 6 sec. | 90% |
| PE1-4 | Irradiation Time: 4 sec. | 95% |
| PE2-1 | Irradiation Time: 10 sec. | 91% |
| PE2-2 | Irradiation Time: 8 sec. | 92% |
| PE2-3 | Irradiation Time: 6 sec. | 94% |
| PE2-4 | Irradiation Time: 4 sec. | 97% |
| PE3-1 | Gas Flow Rate: 2 sccm | 80% |
| PE3-2 | Gas Flow Rate: 1 sccm | 85% |
| PE4-1 | Gas Flow Rate: 2 sccm | 83% |
| PE4-2 | Gas Flow Rate: 1 sccm | 87% |
| CE1 | No Process | 100% |
| CE2 | Exposed to Atmosphere | 55% |

According to results of the studies made by the present inventor and the evaluation results of the bonded ratios obtained in the practical examples PE1-1 through PE4-2, it is confirmed that the bonded ratio between the protection layer and the lubricant layer of the magnetic recording medium can be controlled in a relatively wide range of 60% to 99%, with a satisfactory reproducibility, for the practical examples PE1-1 through PE4-2 in which the lubricant layer is formed by the vapor-phase lubrication.

According to the embodiment and practical examples described above, the bonded ratio between the protection layer and the lubricant layer can be controlled in a relatively wide range with a satisfactory reproducibility.

Further, the present invention is not limited to these practical examples, but various variations and modifications may be made without departing from the scope of the present invention.

What is claimed is:

1. A method of fabricating a magnetic recording medium by sequentially forming a magnetic recording layer, a protection layer, and a lubricant layer on a stacked body, comprising:

forming the lubricant layer of a lubricant on a surface of the protection layer by vapor-phase lubrication, that introduces vapor of a high molecular compound of the lubricant, without exposing the stacked body to atmosphere after forming the protection layer on the stacked body; and injecting nitrogen atoms or oxygen atoms onto the surface of the protection layer after forming the protection layer and before forming the lubricant layer, wherein the injecting controls a bonded ratio between the protection layer and the lubricant layer to a value, within a range of 60% to 99%, that is lower than a bonded ratio for a case in which the nitrogen atoms or the oxygen atoms are not injected onto the surface of the protection layer after forming the protection layer and before forming the lubricant layer.

2. A method of fabricating a magnetic recording medium by sequentially forming a magnetic recording layer, a protection layer, and a lubricant layer on a stacked body, comprising:

forming the lubricant layer of a lubricant on a surface of the protection layer by vapor-phase lubrication, that introduces vapor of a high molecular compound of the lubricant, without exposing the stacked body to atmosphere after forming the protection layer on the stacked body; and performing nitriding or oxidation of the surface of the protection layer after forming the protection layer and before forming the lubricant layer, wherein the performing the nitriding or oxidation controls a bonded ratio between the protection layer and the lubricant layer to a value, within a range of 60% to 99%, that is lower than a bonded ratio for a case in which the nitriding or the oxidation is not performed on the surface of the protection layer after forming the protection layer and before forming the lubricant layer.

3. The method of fabricating the magnetic recording medium as claimed in claim 2, wherein the performing the nitriding or oxidation introduces nitrogen gas or oxygen gas into a reaction chamber at a latter stage of a deposition process that forms the protection layer, to perform the nitriding or the oxidation on the surface of the protection layer after the protection layer is formed by the deposition process.

4. The method of fabricating the magnetic recording medium as claimed in claim 1, further comprising:

providing a region having a gas pressure P3 in a transport path of the stacked body after the formation of the protection layer and before the formation of the lubricant layer, satisfying relationships P3>P1 and P3>P2, where P1 denotes a process gas pressure at a time of forming the protection layer, and P2 denotes a process gas pressure at a time of forming the lubricant layer, wherein a difference between the gas pressure P3 and the process gas pressure P1 is 150 Pa or less, and a difference between the gas pressure P3 and the process gas pressure P2 is 150 Pa or less.

5. The method of fabricating the magnetic recording medium as claimed in claim 2, further comprising:

providing a region having a gas pressure P3 in a transport path of the stacked body after the formation of the protection layer and before the formation of the lubricant layer, satisfying relationships P3>P1 and P3>P2, where P1 denotes a process gas pressure at a time of forming the protection layer, and P2 denotes a process gas pressure at a time of forming the lubricant layer, wherein a difference between the gas pressure P3 and the process gas pressure P1 is 150 Pa or less, and a difference between the gas pressure P3 and the process gas pressure P2 is 150 Pa or less.

* * * * *